United States Patent [19]
Sugito et al.

[11] Patent Number: 5,403,057
[45] Date of Patent: Apr. 4, 1995

[54] OBJECT HOLDING APPARATUS

[75] Inventors: Katsuhiko Sugito; Yasuo Hibi, both of Nagoya, Japan

[73] Assignee: Nippodenso Co., Ltd., Kariya, Japan

[21] Appl. No.: 41,040

[22] Filed: Mar. 31, 1993

[30] Foreign Application Priority Data

Apr. 2, 1992 [JP] Japan .................. 4-080701

[51] Int. Cl.⁶ ............................................. B25J 15/10
[52] U.S. Cl. .................. 294/119.1; 294/88; 294/902; 901/39; 269/266
[58] Field of Search ................ 294/86.4, 87.1, 119.1, 294/902, 88; 901/31, 39; 269/266, 270

[56] References Cited

U.S. PATENT DOCUMENTS

| | | | |
|---|---|---|---|
| 3,868,102 | 2/1975 | Pevar | 269/266 X |
| 4,572,564 | 2/1986 | Cipolla | 294/902 X |
| 4,632,444 | 12/1986 | Martinez et al. | 294/902 X |
| 4,770,455 | 9/1988 | Collins, Jr. | 294/902 X |
| 4,896,914 | 1/1990 | Stevens | 294/119.1 X |
| 4,936,560 | 6/1990 | Barozzi | 269/266 |

FOREIGN PATENT DOCUMENTS

| | | | |
|---|---|---|---|
| 63-278734 | 11/1988 | Japan . | |
| 63-295194 | 12/1988 | Japan . | |
| 2185389 | 7/1990 | Japan . | |
| 876420 | 10/1981 | U.S.S.R. | 294/902 |
| 1098792 | 6/1984 | U.S.S.R. | 294/902 |
| 1215996 | 3/1986 | U.S.S.R. | 901/39 |
| 1342728 | 10/1987 | U.S.S.R. | 294/902 |
| 1442397 | 12/1988 | U.S.S.R. | 294/902 |
| 1657373 | 6/1991 | U.S.S.R. | 901/39 |

Primary Examiner—Dean J. Kramer
Attorney, Agent, or Firm—Cushman, Darby & Cushman

[57] ABSTRACT

An apparatus for holding an object includes a plurality of holding pins and restricting means for restricting displacement thereof. The holding pins are retained on a guide member in a manner movable in the direction projecting therefrom and are displaced to a holding position where the geometry formed by their respective terminal ends upon contact with an object to be held conforms to the contour of said object to be held. The restricting means contacts the outer side surface of the holding pins so as to restrict their movement in the state where the holding pins are displaced to the holding position.

10 Claims, 11 Drawing Sheets

$F_1 = (T_1 + T_2) \sin\beta/2$

OBJECT HOLDING APPARATUS

BACKGROUND OF THE INVENTION

1. Field of the Invention

The present invention relates to an object holding apparatus for holding an object by means of a plurality of holding pins provided on a guide member.

2. Description of Related Art

Recently, a robot for transporting an object, for example, has been contrived, which has a robot hand of the type capable of conforming to complication of the shape of the object.

An example of this type of robot hand has been disclosed in Japanese Patent Unexamined Publication No. 2-185389. This is constructed such that a plurality of resiliently urged sleeve pins are provided on a pair of opposing fingers in a manner projecting therefrom so as to oppose one another. According to the robot hand constructed in this manner, when an object to be held is clamped between the fingers, those sleeve pins abutting against the object to be held are caused to fall into the finger portions correspondingly to the shape of the contour of the object to be held and those sleeve pins which are not caused to fall in are positioned to clamp the object to be held from the upper and lower portions thereof. The object to be held is therefore securely held by the robot hand.

In the case of the above conventional example, however, since the sleeve pins are resiliently urged, the held part in some cases is unable to resist the resilient force of the sleeve pins and is likely to be deformed if the object to be held is of soft material or is so structured.

SUMMARY OF THE INVENTION

In view of the prior art described above, it is an object of the present invention to provide an object holding apparatus capable of securely holding an object to be held which may be easily deformed.

An object holding apparatus of the present invention comprises: a plurality of holding pins which are retained on a guide member in a manner capable of being displaced in the direction projecting therefrom and which may be displaced to the holding position where the shape formed by their respective terminal ends as a result of their contact with the object to be held corresponds to the contour of said object to be held; and restricting means for contacting the respective outer surface of the holding pins in the state where these holding pins are displaced to the holding position so as to restrict their displacement.

It is also possible to cause the restricting means to contact the outer surfaces of the plurality of holding pins so as to simultaneously restrict the respective displacement thereof.

It is furhtermore possible to retain the plurality of holding pins on the guide member so that the shape resulting from serially connecting them comprises a spiral-like geometry and to form the restricting means from a strap-like member which is formed into a spiral corresponding to the holding pins.

In the object holding apparatus of the present invention, when the object to be held is brought into contact with the plurality of holding pins that are provided on the guide member in a manner capable of being displaced, the holding pins are pressed by the object to be held and are displaced to the holding position corresponding to the contour thereof. Since the restricting means then contact the side surface of the holding pins to restrict their displacement, the object may be securely held by the holding pins which are restricted in movement. Accordingly, when holding the object to be held by means of the holding pins, it is possible to hold without applying a force onto the object to be held.

Further, since the displacement of the plurality of holding pins may be simultaneously restricted by the restricting means, it is possible to simplify the construction while exhibiting a similar function as the above holding apparatus of object.

Furthermore, since the strap-like member of a spiral-like form is brought into contact with the outer side surface of the plurality of holding pins arranged in the manner of a spiral on a guide member, the contacting angle between the strap-like member and the holding pin is to be increased toward the center thereof, even though the tension of the strap-like member is attenuated due to its contact with the holding pins. Thereby the pressing force of the strap-like member against the holding pins will not be completely attenuated. Each holding pin may thus be restricted in its movement by a substantially uniform force while exhibiting a similar function as the above holding apparatus of object.

DETAILED DESCRIPTION OF THE PREFERRED EMBODIMENTS

Figure 1:
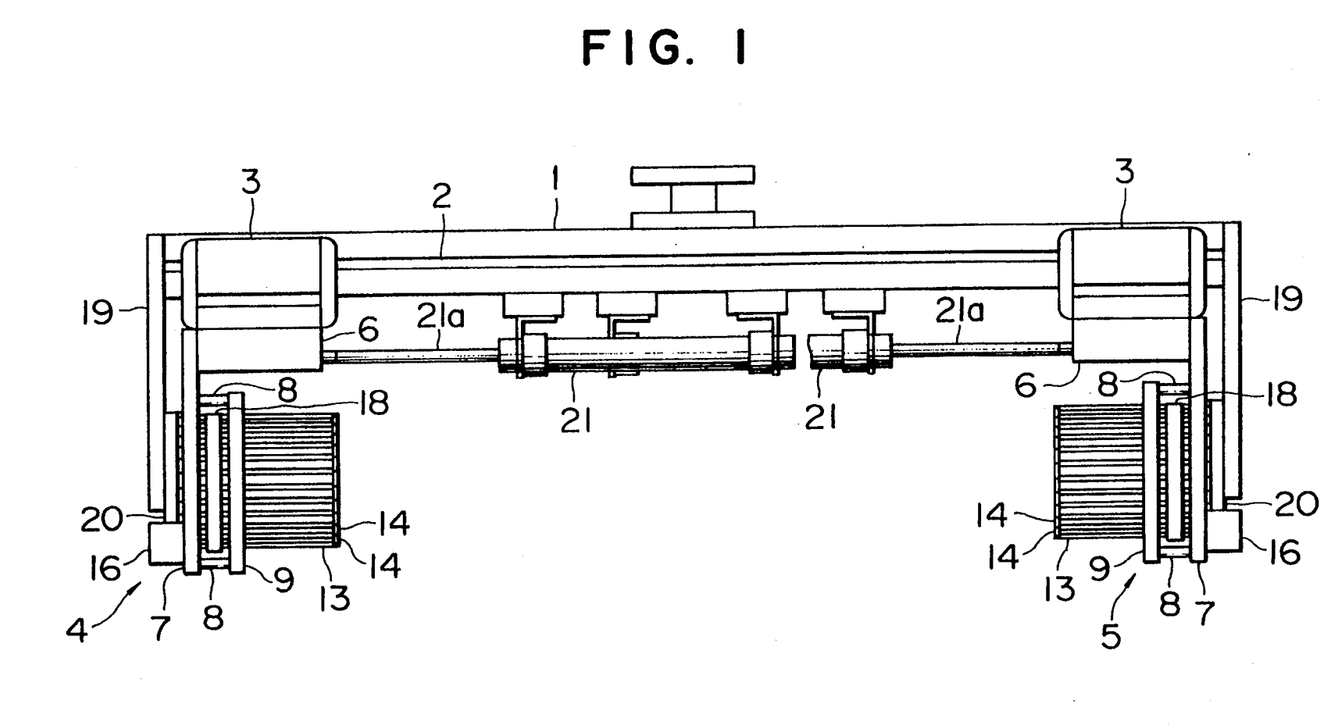
FIG. 1 is a front view of a robot hand showing an embodiment of the present invention.

An embodiment applying the present invention to a robot hand will now be described with reference to FIGS. 1 to 7. FIG. 1 shows a front view of the entire portion of the robot hand. Referring to FIG. 1, a pair of slide units 3, 3 are mounted on an elongated frame 1 by way of a slide guide 2, and the slide units 3, 3 are movable in a direct line (horizontally) along the frame 1.

The slide units 3 respectively have finger portions 4, 5 provided thereon. Since these finger portions 4, 5 are constructed identically to each other, a description will be given only with respect to one finger portion 4 and a description of the other finger portion 5 will be omitted. Specifically, a base 6 is fixed to the lower surface of the slide unit 3 and a first sleeve pin guide 7 serving as a flat plate-like guide member is fixed in a suspended manner to the base 6. Connecting shafts 8 are raised at the corner portions of the first sleeve pin guide 7, and a second sleeve pin guide 9 serving as a flat plate-like guide member is fixed to the connecting shafts 8.

Figure 2:
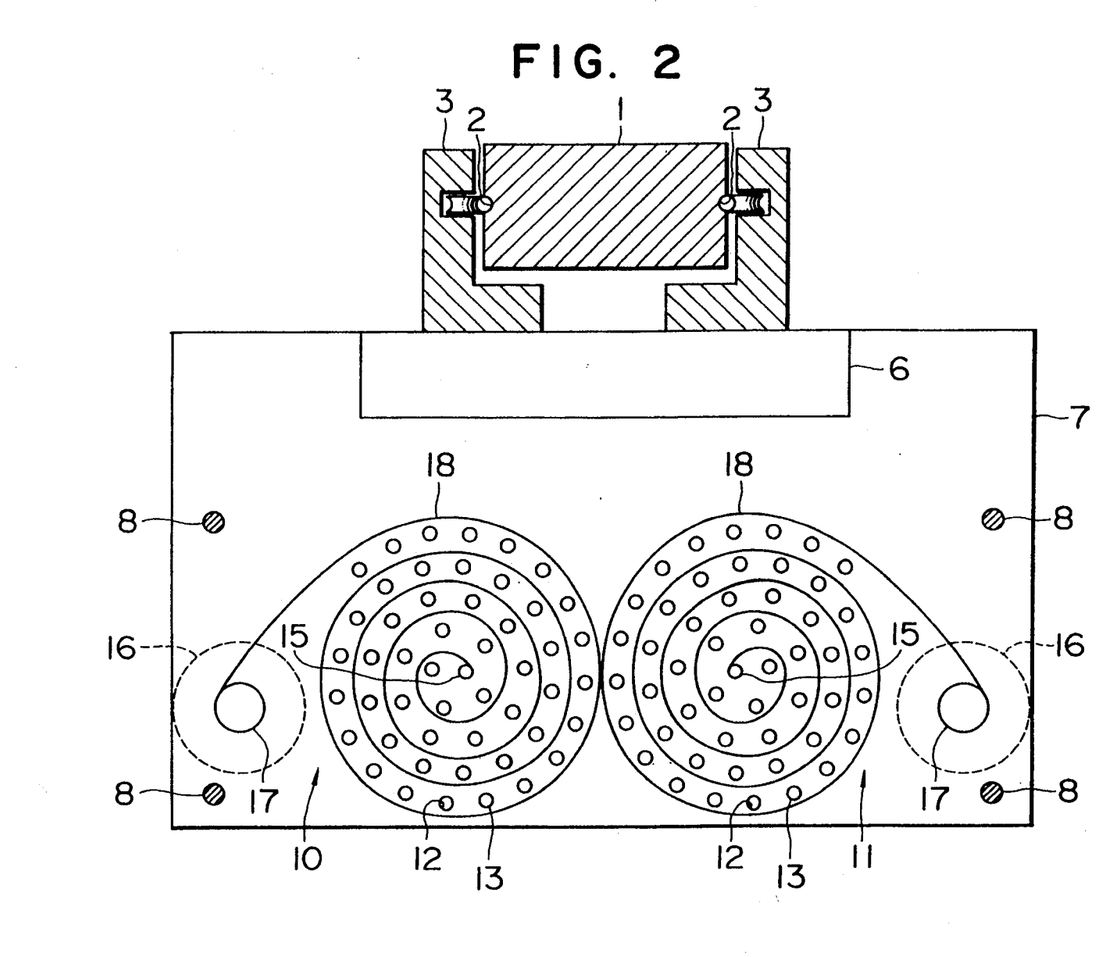
FIG. 2 is a side view of the finger portion of FIG. 1.

Referring now to FIG. 2 showing the state where the second sleeve pin guide 9 is removed, two sets of retaining mechanisms 10, 11 are provided on the first sleeve pin guide 7. Since these retaining mechanisms 10, 11 are constructed identically to each other, only one retaining mechanism 10 will be described to facilitate description.

That is, the first and second sleeve pin guides 7, 9 have a plurality of holes 12, respectively, at positions opposing to one another and, in this case, they are set so that the geometry connecting these holes 12 forms a spiral. Further, a sleeve pin 13 serving as a holding pin is inserted into each hole 12 and these sleeve pins 13 penetrate through the sleeve pin guides 7, 9. Here, a cap 14 (see FIG. 1) is secured to the both ends of each sleeve pin 13, thereby allowing each sleeve pin 13 to be held by the sleeve pin guides 7, 9 in a telescopic manner and are linearly movable toward the direction projecting therefrom. It should be noted that a fixing pin 15 is fixed to the hole 12 which is located at the center (the center of a spiral) of a group of holes 12.

On the other hand, a pneumatic rotary actuator 16 is fixed to the sleeve pin guide 7. When air is supplied from a compressor (not shown), the pneumatic rotary actuator 16 rotates a cylindrical rotating body 17 which is positioned between the sleeve pin guides 7, 9.

Further, a steel belt 18 which serves as restricting means in the form of a spiral-like strap is arranged among the sleeve pins 13 that are arranged in the manner of a spiral. The base end portion of the steel belt 18 is fixed to the fixing pin 15 and the terminal end portion thereof is fixed to the rotating body 17 of the pneumatic rotary actuator 16. In this case, at the non-driven state of the pneumatic actuator 16, the steel belt 18 is in its non-contacting state as shown in FIG. 2 where it is separated by a predetermined dimension from the outer side surface of each sleeve pin 13.

Also, an end plate 19 is fixed in a suspended manner to the two end portions of the frame 1 and an initializing plate 20 facing the sleeve pin guide 7 is fixed to each end plate 19.

Here, a pneumatic cylinder 21 is fixed to the lower surface of the frame 1 and a rod 21a thereof is connected to the base 6 at the finger portion 4. The pneumatic cylinder 21 is constructed so as to extend and retract the rod 21a in accordance with the state of supply of air from a compressor (not shown).

Here, control of supply of air to said pneumatic rotary actuator 16 and the pneumatic cylinder 21 is to be performed by a control unit (not shown).

Further, the entire robot hand constructed as above is moved three-dimensionally by a transporting mechanism (not shown).

It should be noted that, for reference, the main elements of the sleeve pin guides 7, 9, sleeve pin 13 and the steel belt 18 are as follows: the sleeve pin guides 7, 9 are made of a vinyl chloride material; the sleeve pin 13 has a total length of 100 mm and an outer diameter $\Phi$ of 4.0 mm and is made of STKM 11A; and the steel belt 18 has a width of 15 mm and a thickness of 0.15 mm and is made of SUS 304. In this case, it is a matter of course that those of other dimensions and/or material may also be used as these members as far as the desired functions are satisfied.

Further, instead of the pneumatic rotary actuator 16, a pneumatic cylinder or a motor may also be used.

The operation of the above construction will now be described. When the control unit causes the pneumatic cylinder 21 to extend the rod 21a, the finger portions 4, 5 provided on the slide unit 3 are respectively displaced toward the two ends thereof. Upon abutting of the sleeve pin guide 7 of the finger portions 4, 5 against the initializing plate 20, the sleeve pin 13 is pressed by the initializing plate 20 to be displaced to the position as shown in FIG. 1 where it is projecting from the sleeve pin guides 7, 9.

Figure 3:
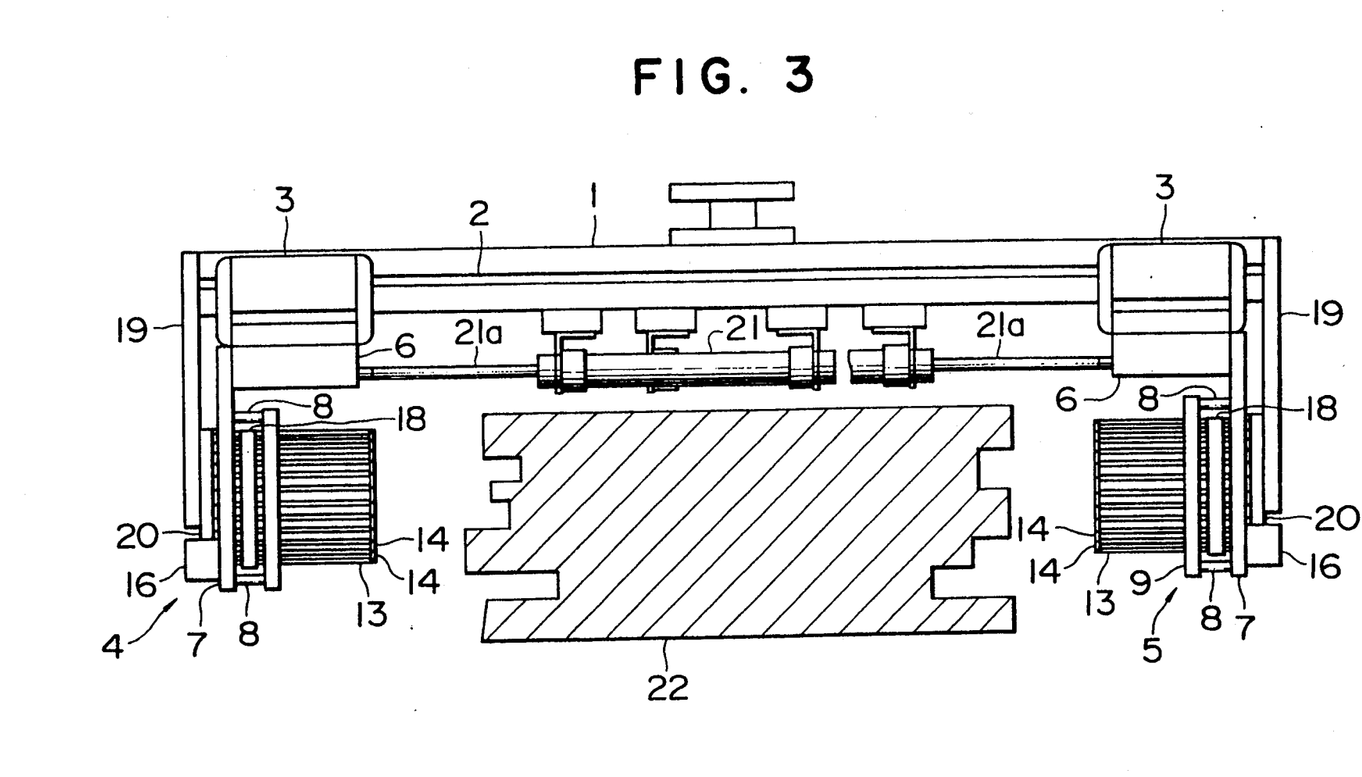
FIG. 3 is a front view corresponding to FIG. 1 showing the state before holding an object to be held.
Figure 4:
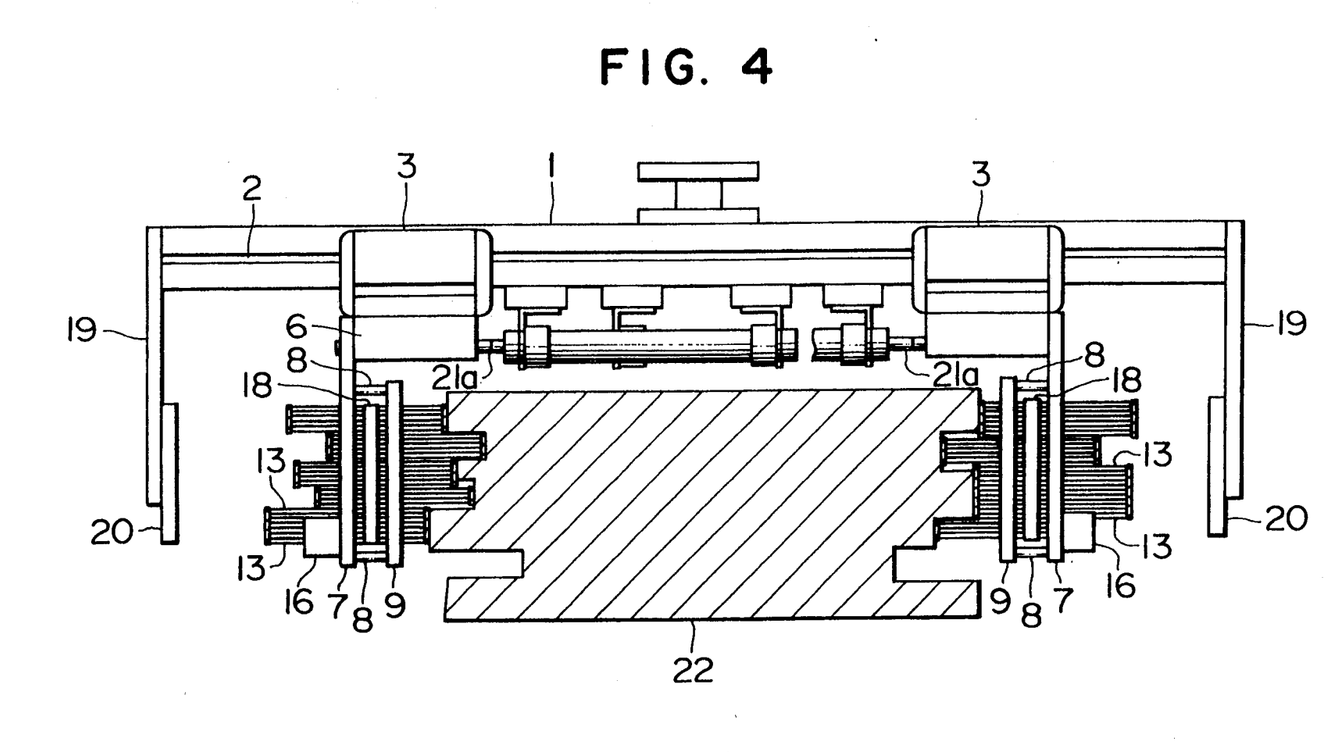
FIG. 4 is a front view corresponding to FIG. 1 showing the clamped state of the object to be held.

Subsequently, as shown in FIG. 3, as the control unit causes the pneumatic cylinder 21 to retract the rod 21a in the state where an object 22 to be held is positioned between the finger portions 4, 5, the finger portions 4, 5 with their sleeve pins 13 being projected are moved toward each other so as to cause the sleeve pin 13 to abut against the side surface of the object 22 to be held. When the finger portions 4, 5 are moved further inward by the drive of the pneumatic cylinder 21, the sleeve pins 13 abutting against the side surface of the object 22 begin to fall into the interior of the sleeve pin guide 9 as they are pressed by the object 22. Then, in the state where the rod 21a of the pneumatic cylinder 21 is completely withdrawn, the respective sleeve pins 13 of the finger portions 4, 5 are moved to their holding position so that their terminal ends exhibit as shown in FIG. 4 a contour corresponding to the irregularity of the side surface of the object 22 to be held.

Figure 5:
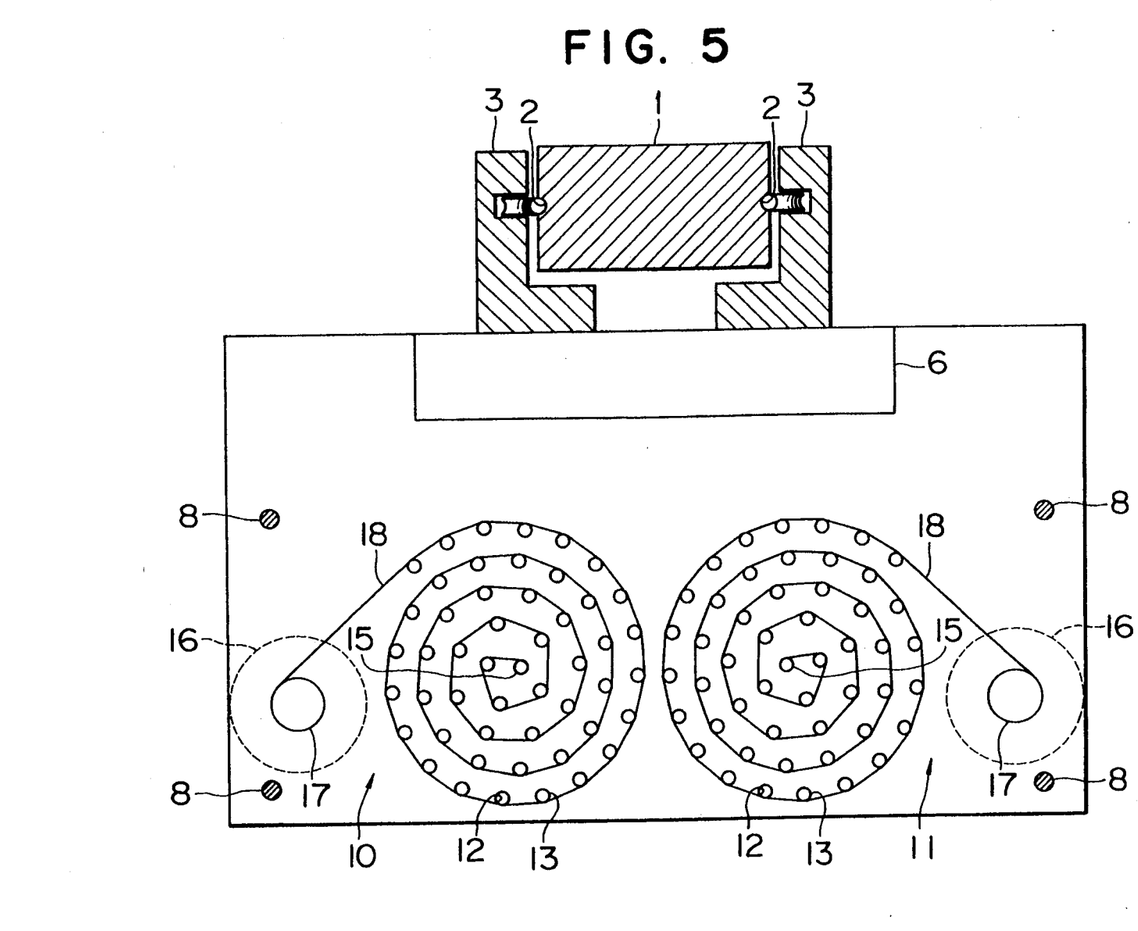
FIG. 5 is a side view corresponding to FIG. 1 showing the locked state of the holding pins.

Subsequently, the pneumatic rotary actuator 16 is driven by the control unit. Since, then, the rotating body 17 of the pneumatic rotary actuator 16 is rotated to take up the steel belt 18, the steel belt 18 as a whole is reduced in its diameter as shown in FIG. 5. As a result, the steel belt 18 is caused to firmly contact with the outer side surface of the respective sleeve pins 13, thereby allowing the sleeve pins 13 to be restricted in their movement due to the friction thereof with the steel belt 18.

Subsequently, the robot hand holding the object 22 in the manner as described is elevated by a transporting mechanism. At this time, since the sleeve pins 13 advance on the concave portion on the side surface of the held object 22, the held object 22 is restricted in its horizontal movement at its two side surfaces by the sleeve pins 13 and is elevated in the state where the upper surface of its concave portion is hooked up at the sleeve pin 13 as the sleeve pins 13 are elevated with the rising of the robot hand. Then, when moved to a predetermined position by the transporting mechanism, the robot hand releases the object 22 by separating the finger portions 4, 5 from each other by the pneumatic cylinder 21. Thereby, the object 22 to be held may be transported to a predetermined position using the robot hand.

Figure 6:
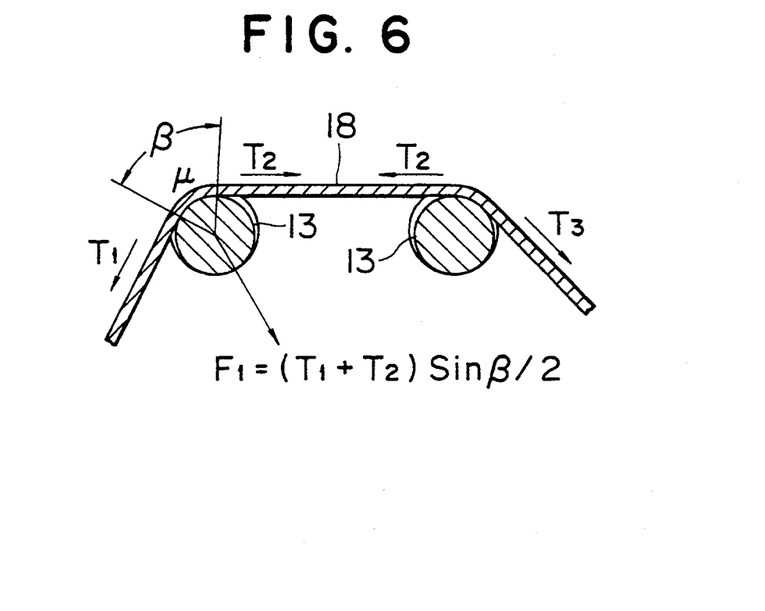
FIG. 6 is a sectional view of the main portion for explaining the function of the locked state of the holding pins.

An investigation will now be made with respect to pressing force on the respective sleeve pins 13 pressed due to contact with the steel belt 18 in the above described manner. Taking notice of two sleeve pins 13 as shown in FIG. 6 and supposing that: the tensile forces to be applied on the steel belt 18 at the portions turned by the respective sleeve pins 13 are T1, T2, T3; the angle at which the steel belt 18 wraps the sleeve pin 13 is $\beta$; and coefficient of friction between the sleeve pin 13 and the steel belt 18 is $\mu$. Then, it is possible to represent $T2=T1/e^{\mu\beta}$, since the attenuation rate due to friction may be represented by $1/e^{\mu\beta}$.

Further, since the pressing force F1 caused by the steel belt 18 against the two sleeve pins 13 may be represented by the sum of about $T1 \cdot \sin \beta/2$ which is the pressing force caused by the tensile force T1 and about $T2 \cdot \sin \beta/2$ which is the pressing force by the tensile force T2, it may be after all represented as:

$$F1 \approx (T1 + T2) \sin \frac{\beta}{2}$$

In this case, supposing that the wrapping angle of the steel belt 18 at each sleeve pin 13 is constant, the pressing force F2 by the steel belt 18 against the sleeve pin 13 becomes $F2=(T2+T3) \sin \beta/2=(T1/e^{\mu\beta}+T2/e^{\mu\beta}) \sin \beta/2=1/e^{\mu\beta} \cdot (T1+T2) \sin \beta/2 = F1/e^{\mu\beta}$, so that uniform pressing force cannot be obtained because the pressing force against the sleeve pin 13 is attenuated in a similar manner as the tensile force of the steel belt 18 at the attenuation rate of $1/e^{\mu\beta}$.

In the case of the above described embodiment, however, since the sleeve pins 13 are arranged in the manner of a spiral, the wrapping angle of the steel belt 18 at each sleeve pin 13 is larger as the position of the sleeve pin 13 is disposed toward the center of the spiral. Thereby, though the tensile force of the steel belt 18 is attenuated by the friction force between the sleeve pins 13 and the steel belt 18 as described, the wrapping angle thereof is increased in a manner compensating therefor so that, as a result, the pressing force by the steel belt 18 against the sleeve pin 13 is uniform.

Figure 7:
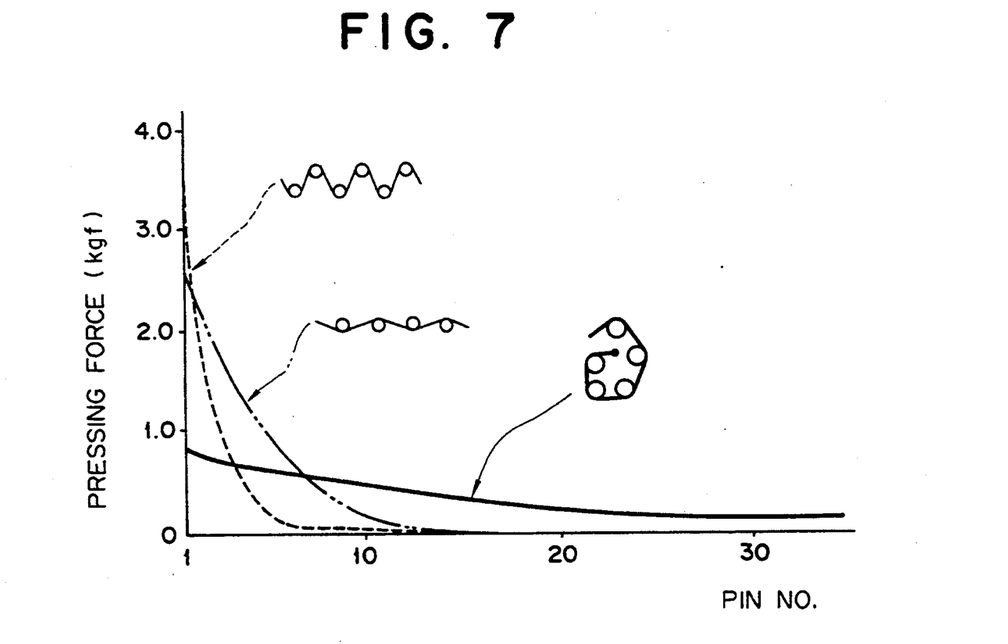
FIG. 7 shows the characteristic of the pressing force in the embodiment of FIG. 1.

Then, the inventor measured the pressing force by the steel belt 18 against each sleeve pin 13 in the present embodiment and also measured the pressing forces in the case where the wrapping angles of the steel belt 18 over the sleeve pins 13 were constant, the results being shown in FIG. 7. In this case, the steel belt 18 was wound on the sleeve pins 13 which were arranged in a zigzag as indicated in FIG. 7 as the construction to make constant the wrapping angle of the steel belt 18 over the sleeve pins. Here, in FIG. 7, the solid line indicates the pressing force in the present embodiment; the two-dot chain line indicates a case where the wrapping angle of the steel belt 18 over the sleeve pins 13 is constant at 40°; and the broken line indicates a case where the wrapping angle is constant at 128°. Setting in this case is such that the pin No. is smaller as the pin is located toward the tensile force imparting side (the side of the pneumatic rotary actuator 16).

As can be seen from FIG. 7, in the cases where the wrapping angle is constant, the pressing force is largely attenuated every time when turned at each sleeve pin 13 and the pressing force over sleeve pins 13 at some midway point and after becomes almost zero. On the other hand, according to the present embodiment, the pressing force over the sleeve pins 13 is substantially uniform without being largely attenuated and the steel belt 18 imparts a predetermined pressing force even to the last sleeve pin 13 which is disposed at the center of the spiral.

According to the above embodiment, the sleeve pins 13 of the finger portions 4, 5 of the robot hand are provided in a manner movable with respect to the sleeve pin guides 7, 9 and the sleeve pins 13 displaced to the holding position by means of contact with the object 22 to be held are restricted in their movement by the pressing force of the steel belt 18. In the state where the object is held by the sleeve pins 13, the pressing force of the sleeve pins 13 over the held object 22 is therefore substantially zero. Thus, unlike the conventional example where the object is held by an elastic object, the object 22 may be securely held without being deformed even if the object 22 to be held is soft as a material and/or is structurally soft.

Further, in the case of the above described embodiment, the displacement of a large number of the sleeve pins 13 is restricted by a single steel belt 18. Thus, the overall structure thereof may be simplified comparing to the construction in which each sleeve pin 13 is independently restricted in movement and it is possible to impart substantially a uniform pressing force to each sleeve pin 13 by the construction peculiar to the present embodiment where the sleeve pins 13 are arranged in the manner of a spiral.

Furthermore, since elastic caps 14 are fixed to the terminal ends of the sleeve pins 13, the frictional force between the cap 14 and the object 22 to be held is increased, so that the object 22 may be securely held.

Figure 8:
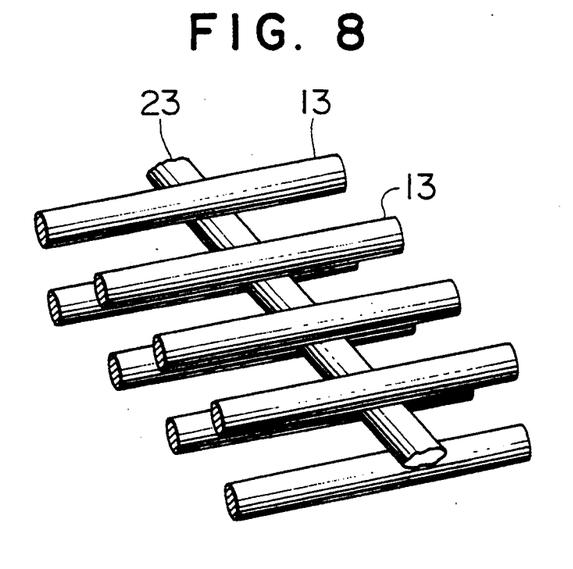
FIG. 8 is a schematic view showing the unlocked state of the holding pins in another embodiment of the present invention.
Figure 9:
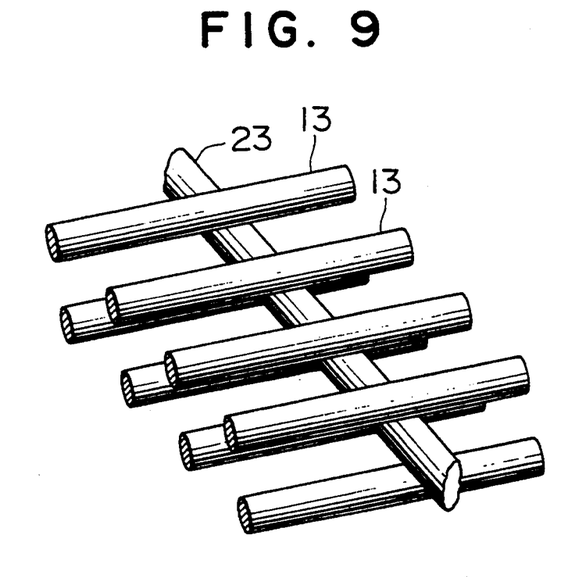
FIG. 9 is a schematic view showing the locked state of the holding pins of FIG. 8.

FIG. 8 and FIG. 9 show another embodiment of the present invention. This embodiment is different from the foregoing first embodiment in the arrangement of the sleeve pins 13 and in that a restricting means 23 is provided instead of the steel belt 18 of the foregoing embodiment. Referring specifically to FIG. 8, the sleeve pins 13 are arranged in parallel to each other in the manner of a matrix, and a restricting means 23 in the form of a bar having an elliptic cross section is provided in a rotatable manner among the sleeve pins 13. Thus, in the state where the restricting means 23 is rotated by 90°, the restricting means 23 is brought into contact with the outer side surface of the sleeve pins 13 as shown in FIG. 9 to thereby restrict their movement.

Figure 10:
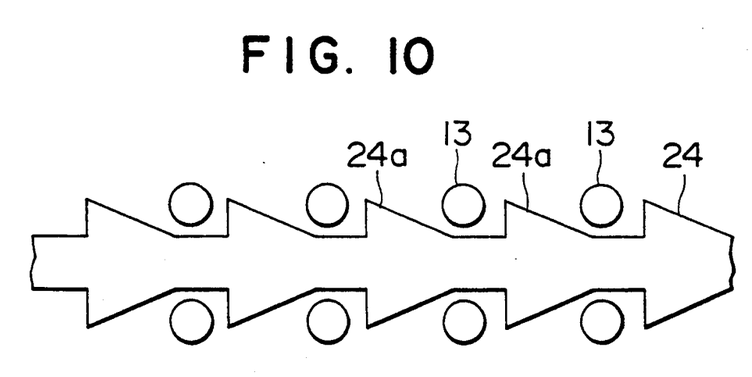
FIG. 10 is a schematic view showing the unlocked state of the holding pins in a further embodiment of the present invention.
Figure 11:
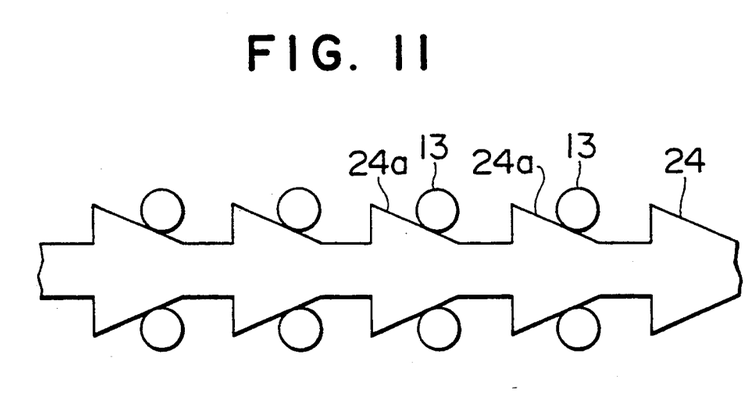
FIG. 11 is a schematic view showing the locked state of the holding pins of FIG. 10.

FIG. 10 and FIG. 11 show a further embodiment of the present invention. Referring specifically to FIG. 10, a restricting means 24 is disposed among the sleeve pins 13 which are disposed in parallel to one another in the manner of a matrix. The restricting means 24 has sloped surface portions 24a formed in the manner of a swell at fixed intervals. Thus, when the restricting means 24 is moved along the axial direction thereof, the sloped surface portions 24a are caused to abut against the sleeve pins 13 as shown in FIG. 11 so as to restrict their movement.

Figure 12:
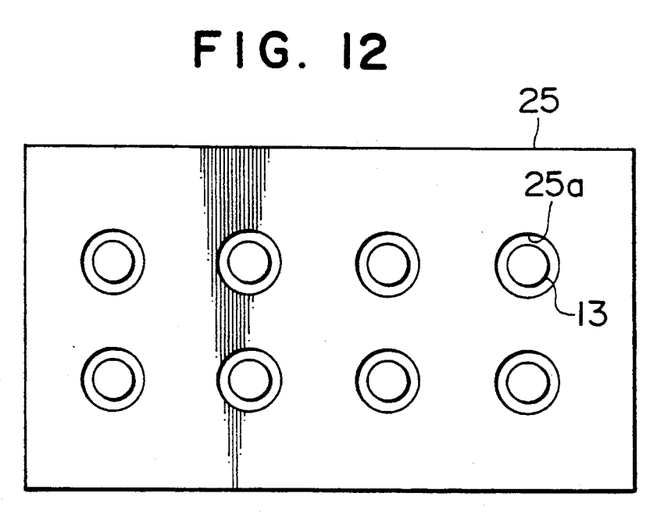
FIG. 12 is a schematic view showing the unlocked state of the holding pins of a still further embodiment of the present invention.
Figure 13:
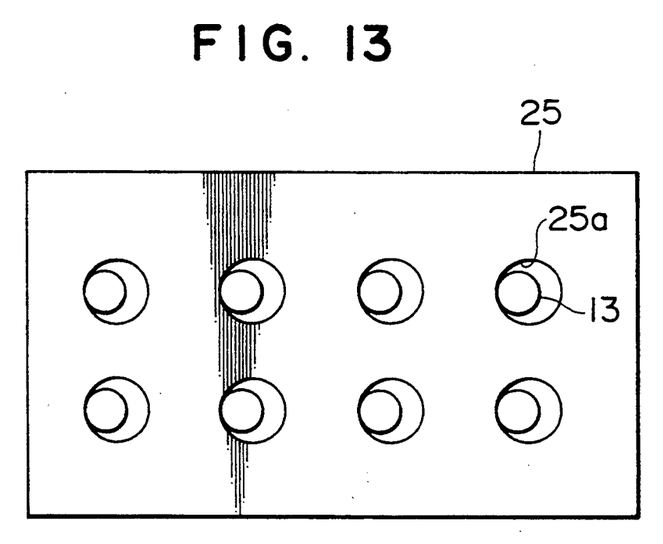
FIG. 13 is a schematic view showing the locked state of the holding pins of FIG. 12.

FIG. 12 and FIG. 13 show a still further embodiment of the present invention. Referring specifically to FIG. 12, a plate-like restricting means 25 has holes 25a which are larger in diameter than the sleeve pins 13 and the sleeve pins 13 are inserted into the holes 25a in the manner of loose fit. Then, when the restricting means 25 is translated with respect to the sleeve pin guides 7, 9, the inner peripheral surfaces of the holes 25a of the restricting means 25 are brought into a firm contact with the sleeve pins 13 as shown in FIG. 13 so as to restrict their movement.

Figure 14:
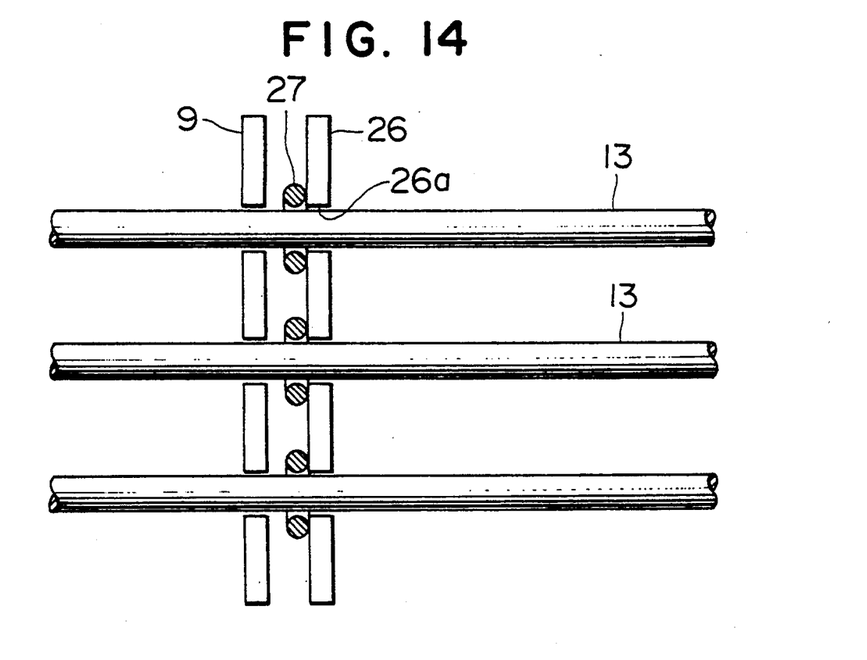
FIG. 14 is a schematic view showing the unlocked state of the holding pins in yet another embodiment of the present invention.
Figure 15:
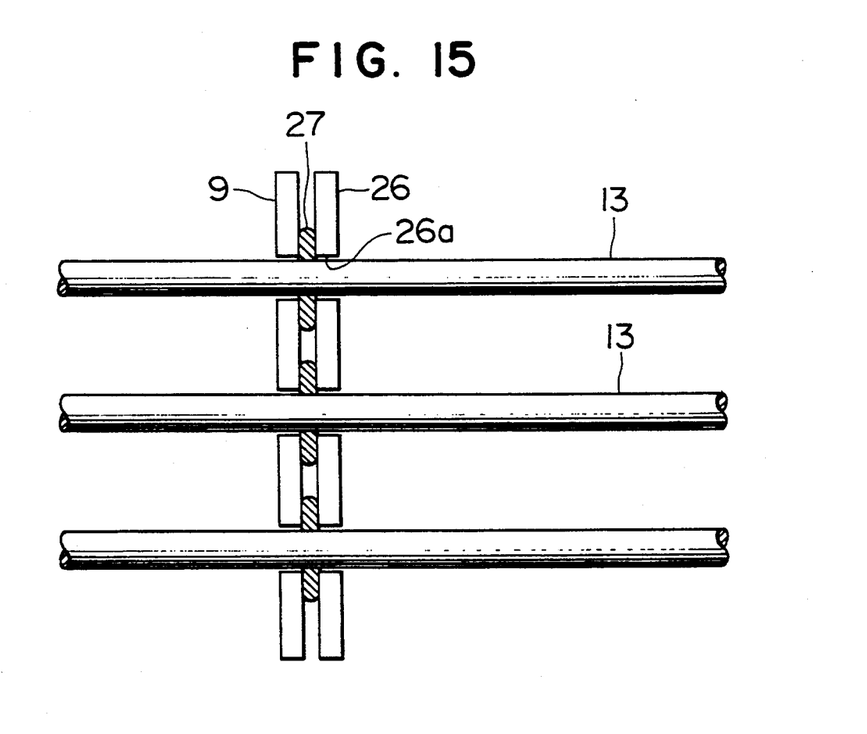
FIG. 15 is a schematic view showing the locked state of the holding pins of FIG. 14.

FIG. 14 and FIG. 15 show yet another embodiment of the present invention. Referring specifically to FIG. 14, a pressing member 26 in the form of a plate opposing the second sleeve pin guide 9 has a hole 26a formed thereon with a diameter larger than that of the sleeve pin 13 and an O-ring 27 serving as the restricting means having its inner diameter slightly larger than that of the sleeve pin 13 is provided correspondingly to the hole 26a. The sleeve pin 13 is inserted into the O-ring 27 in the manner of loose fit. Here, in the state where the pressing member 26 is caused to abut against the second sleeve pin guide 9 in the axial direction of the sleeve pin 13, the O-ring 27 is squeezed as shown in FIG. 15 by the pressing member 26 and the sleeve pin guide 9. The O-ring 27 is thereby reduced in diameter so that the inner peripheral surface thereof contacts firmly with the sleeve pin 13 to restrict the movement thereof.

Figure 16:
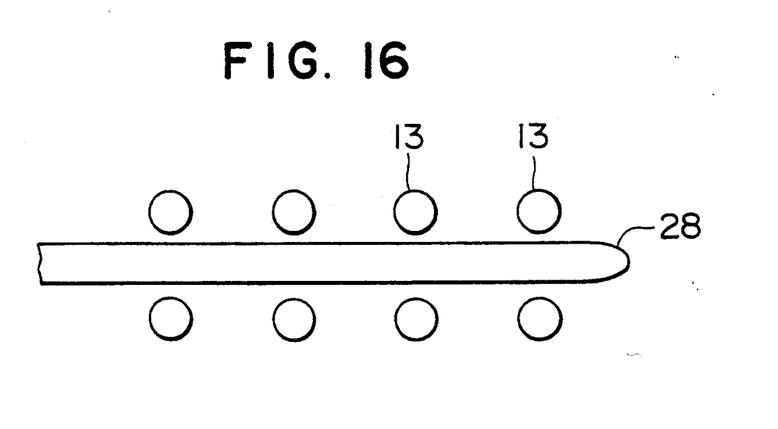
FIG. 16 is a schematic view showing unlocked state of the holding pins in a yet further embodiment of the present invention.
Figure 17:
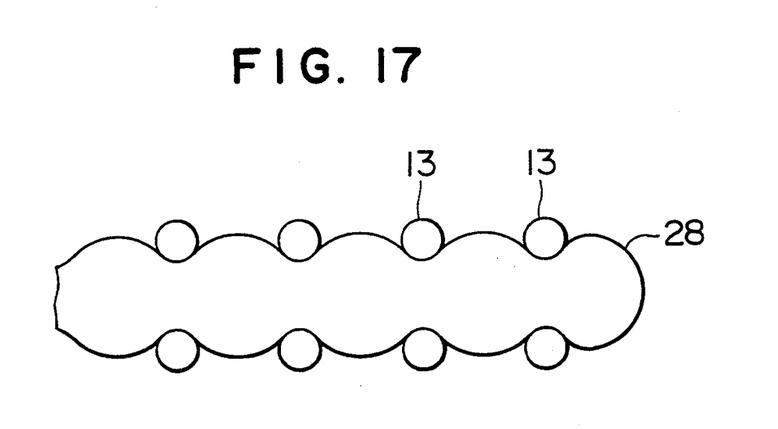
FIG. 17 is a schematic view showing the locked state of the holding pins of FIG. 16.

FIG. 16 and FIG. 17 show a yet further embodiment of the present invention. Referring specifically to FIG. 16, a rubber tube 28 serving as the restricting means is disposed among the sleeve pins 13. Here, in the state where the rubber tube 28 is inflated as shown in FIG. 17, the rubber tube 28 firmly contact the outer side surface of the sleeve pin 13 so as to restrict the movement thereof.

It should be noted that, while, in the above described embodiments, a case has been shown where the present invention is applied to a robot hand, it may also be applied to a supporting device for supporting a pallet having an irregularity at its bottom from the lower side thereof or to a pressing device for pressing an object without a definite form from the upper side thereof.

As is apparent from the forgoing description, the holding apparatus of object of the present invention has the following advantages.

According to a holding apparatus of object of the above described embodiment, a plurality of holding pins are provided, which are retained on a guide member in a manner capable of being displaced to the direction projecting therefrom and which may be displaced to a holding position where the contour formed by the respective terminal ends thereof upon contact with an object to be held is brought into harmony with the contour of the object to be held. And a restricting means is provided, which contacts the outer side surface of the respective holding pins in the state where the holding pins are displaced to the holding position so as to restrict their displacement. Thus, it is possible to securely hold an object which may be easily deformed.

Further, according to a holding apparatus of object as described, since the restricting means is adapted so that it contacts the outer side surface of a plurality of the holding pins to simultaneously restrict the displacement thereof, simplification of the construction may be achieved with an advantage similar to that of the foregoing holding apparatus of object.

Furthermore, according to a holding apparatus of object as described, a plurality of holding pins are retained on a guide member such that the geometry obtained by connecting them forms a spiral and a restricting means is provided as a strap-like member formed in the manner of a spiral corresponding to said holding pins. Thereby, the respective holding pins may be restricted in their movement by a substantially uniform force while maintaining a similar advantages as the foregoing holding apparatus of object.

What is claimed is:

1. An object holding apparatus comprising:
   a plurality of holding pins;
   a guide member retaining said holding pins so that said holding pins are freely movable in a direction projecting from said guide member and displaceable to a holding position where a shape formed by respective terminal ends of said holding pins as a result of contact of the holding pins with an object to be held, corresponds to a contour of said object to be held, said holding pins being constructed and arranged to contact said object in such a manner so as to not deform said object; and
   restricting means for contacting the respective outer surface of the holding pins and restricting their displacement in the state where the holding pins are moved to said holding position by a frictional force between said holding pins and the restricting means,
   wherein the restricting means has a strap-like member for generating a frictional force between said holding pins and the restricting means.

2. An object holding apparatus according to claim 1, wherein the plurality of holding pins are retained on the guide member where the geometry obtained by connecting said holding pins with said strip-like member defines a spiral-like configuration.

3. An object holding apparatus according to claim 2, wherein the contacting angle between said strap-like member and said holding pins becomes larger towards the center of the spiral-like configuration.

4. An object holding apparatus according to claim 2, further comprising an actuator connected to an end of said strap-like member for tensing said strap-like member to thereby generate and increase a frictional force between said holding pins and the strap-like member.

5. An object holding apparatus according to claim 2, wherein said strap-like member is a steel belt.

6. An object holding apparatus comprising:
   a plurality of holding pins;
   a guide member retaining said holding pins so that said holding pins are freely movable in a direction projecting from said guide member and displaceable to a holding position where a shape formed by respective terminal ends of said holding pins as a result of contact of the holing pins with an object to be held, corresponds to a contour of said object to be held; and
   restricting means for contacting respective outer surface of the holding pins and restricting their displacement in the state where the holding pins are moved to said holding position,
   said restricting means including a strap-like member for generating a frictional force between said holding pins and the restricting means,
   said plurality of holding pins being retained on the guide member where the geometry obtained by connecting said holding pins with said strip-like member defines a spiral-like configuration corresponding to said holding pins.

7. An object holding apparatus according to claim 6, wherein the contacting angle between said strap-like member and said holding pins becomes larger towards the center of the spiral-like configuration.

8. An object holding apparatus according to claim 6, further comprising an actuator connected to an end of said strap-like member for tensing said strap-like member to thereby generate and increase holding force.

9. An object holding apparatus according to claim 6, wherein the holding force is a frictional force between the holding pins and the strap-like member.

10. An object holding apparatus according to claim 6, wherein the strap-like member comprises a steel belt.

* * * * *